United States Patent [19]

Dall'Omo

[11] Patent Number: 5,287,679
[45] Date of Patent: Feb. 22, 1994

[54] DEVICE FOR INDUCING SLACK IN A WRAPPING FILM, ASSOCIATED WITH MEANS FOR HEAT SEALING PACKS OF ROLLS

[75] Inventor: Davide Dall'Omo, Bologna, Italy
[73] Assignee: Wrapmatic S.p.A., Bologna, Italy
[21] Appl. No.: 960,719
[22] Filed: Oct. 14, 1992

[30] Foreign Application Priority Data

Oct. 31, 1991 [IT] Italy .................. BO91A000409

[51] Int. Cl.⁵ .................................. B65B 11/00
[52] U.S. Cl. ......................... 53/466; 53/228; 53/375.9; 53/463; 53/528
[58] Field of Search ............... 156/163, 494; 53/228, 53/231, 232, 233, 375.9, 376.2, 463, 466, 526, 528, 586

[56] References Cited

U.S. PATENT DOCUMENTS

| | | | |
|---|---|---|---|
| 3,631,649 | 1/1972 | Close et al. | 53/463 X |
| 3,705,476 | 12/1972 | Wolf . | |
| 4,435,945 | 3/1984 | Rohrig | 53/375.9 X |
| 4,624,096 | 11/1986 | Norstrom | 53/209 |
| 4,679,379 | 7/1987 | Cassoli | 53/450 X |
| 4,854,108 | 8/1989 | Cassoli | 53/228 X |
| 4,909,016 | 3/1990 | Rentmeester et al. | 156/494 X |
| 5,038,549 | 8/1991 | Nordstrom | 53/466 X |

*Primary Examiner*—John Sipos
*Assistant Examiner*—Daniel Moon
*Attorney, Agent, or Firm*—Laff, Whitesel, Conte & Saret

[57] ABSTRACT

In a machine for wrapping rolls of household paper in plastic film, the standard heat seal roller is modified by fitting an offset device in the form of a bar set forward of the revolving heated sector in relation to the path followed by the packs of rolls and in the direction of rotation of the roller; the bar projects radially from the roller, and impinges on the sheet of film wrapped around each pack of rolls directed into the heat seal station, causing the two overlapping edges to shift one in relation to the other such that the wrapping is slackened marginally before the edges are joined, affording space into which the rolls can expand once beyond the confines of the heat seal station.

4 Claims, 2 Drawing Sheets

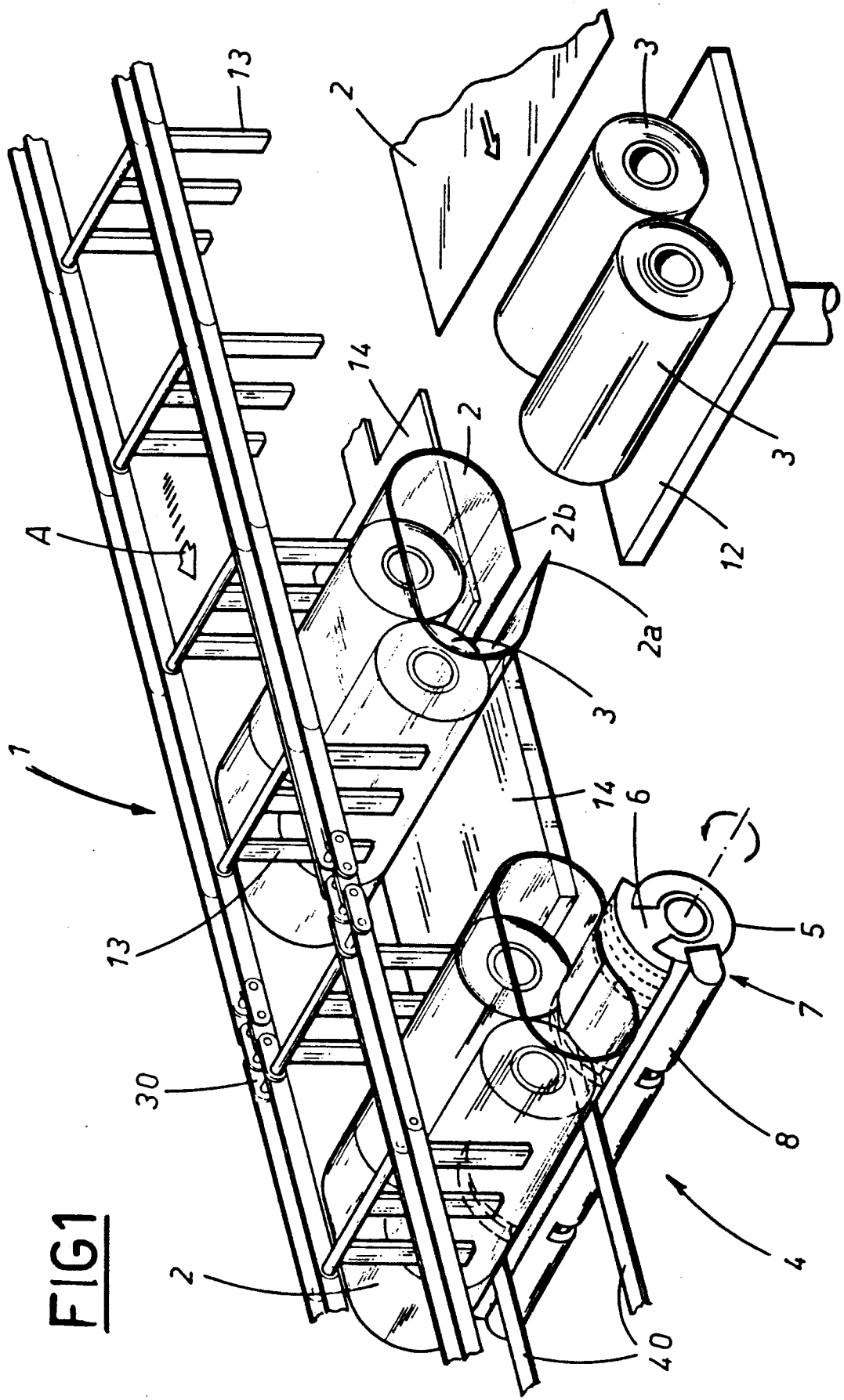

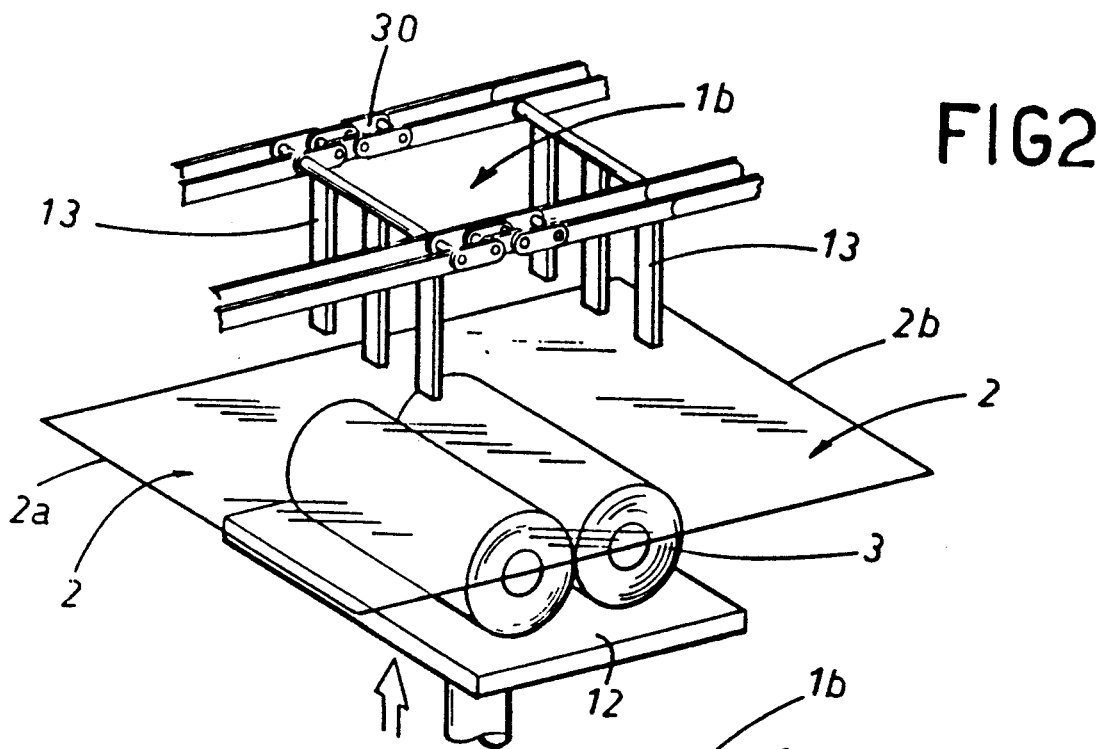
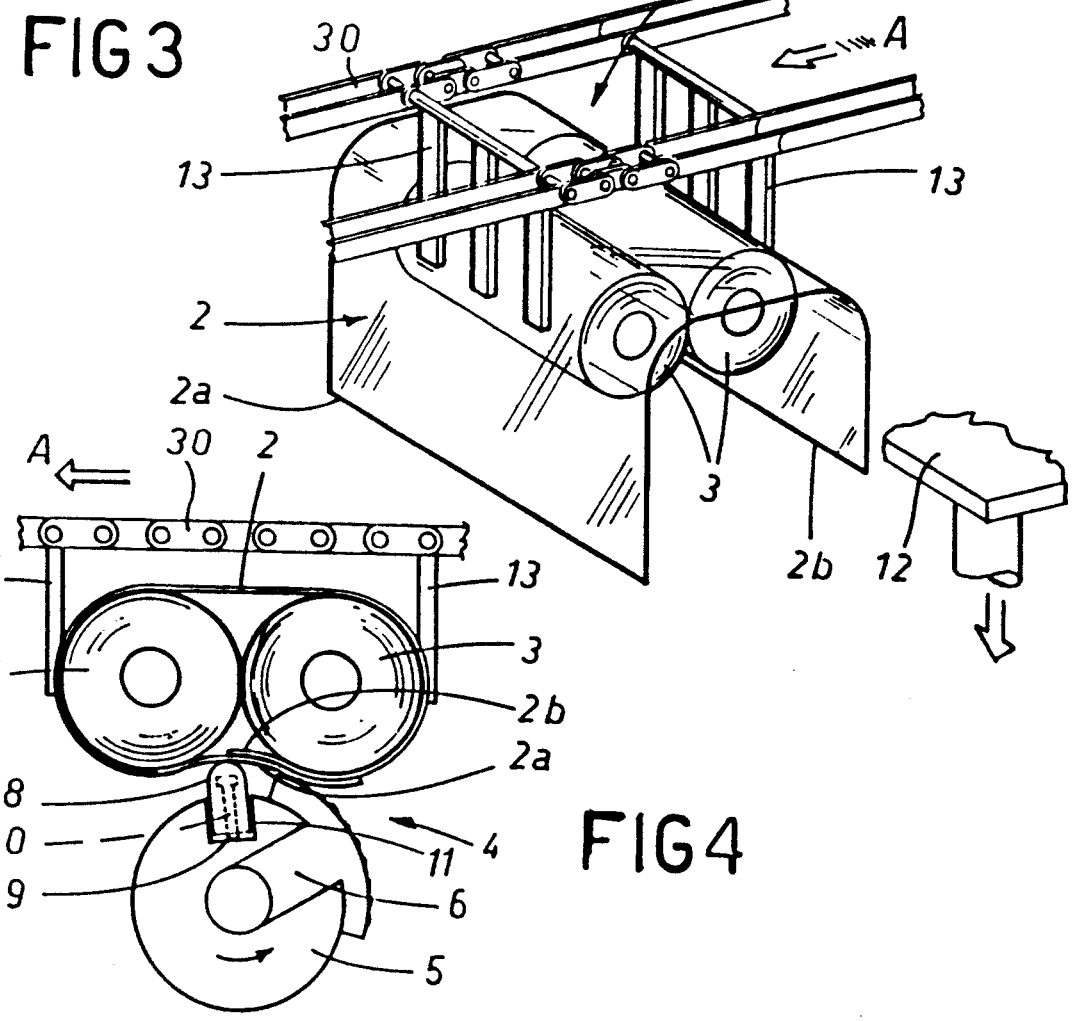
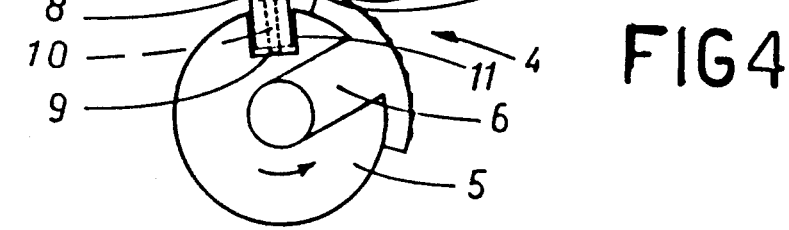

DEVICE FOR INDUCING SLACK IN A WRAPPING FILM, ASSOCIATED WITH MEANS FOR HEAT SEALING PACKS OF ROLLS

BACKGROUND of the INVENTION

The present invention relates to a device for inducing slack in a wrapping film, associated with a station at which packs of rolls are heat sealed in a non-continuous packaging machine.

In a packaging machine of the type in question, traditional packs of two or four rolls are wrapped in a covering of transparent plastic film using a process that involves passage through a succession of stations comprising an elevator by which the rolls are received in pairs, in contact one with another and horizontally disposed, and carried upward in this same configuration to the point of entering a first wrapping station beneath which a sheet of film is extended flat in readiness to be fashioned into a wrapping around the pack.

The ascending rolls are first partially enveloped from above, as a result both of investing the sheet and of the reaction afforded by a pair of vertical restraints between which the rolls remain lodged when the elevator returns to the lowered position for a successive cycle. The stations next in line are equipped with understroking horizontal folding or flattening devices, from which the pack emerges with the sheet of wrapping film passed fully around the rolls and the two flattened edges overlapping. The vertical restraints are embodied as projecting elements rigidly associated with a pair of looped chains forming a continuous conveyor, the distance between the centers of the restraints establishing the space afforded to the rolls, and the indexing step of the chains determining the distance covered by the packs when transferred from one wrapping station to the next.

The wrapping operations having been effected, all along a predetermined feed axis, the pack of rolls is positioned at a heat seal station where the overlapping edges of the sheet of film are secured; the station in question consists substantially in a roller occupying a position below the feed axis and of axial dimensions corresponding to those of the sheet of film, rotatable about its own axis in a direction concurrent to that followed by the pack and furnished with a heated sector (heat generated from an external source by Joule effect) by which the temperature of the overlapping edges of the sheet of film is raised to the point of softening and thus enabling a heat seal, preferably at points clearly defined by a serrated profile formed on the sector. In successive steps, the end folds of the wrapping are flattened and secured in conventional manner.

The main drawback betrayed by a pack emerging from the stations in question is that of the excessive peripheral tension in the wrapping. In the process of being enveloped by the plastic film, in effect, the paired rolls are pulled together and forced out of shape over the areas breasted in mutual contact; such deformation is caused mainly by the excessive pressure exerted by the horizontal folding devices, in combination with the pressure exerted from each side by the conveyor restraints (necessary in order to support the pack during its passage through the various wrapping steps), and results in a finished package of substandard appearance.

Accordingly, the object of the present invention is to overcome the drawback in question by providing a device for inducing slack in a wrapping sheet that is simple, efficient and precise in operation, and constructed in a way such as to interfere neither with the structure of conventional work stations nor with the packaging and heat seal tempos typical of existing automatic machines.

SUMMARY of the INVENTION

The stated object is amply realized in a device for inducing slack in a wrapping film, designed for association with the heat seal station of a machine for packaging rolls typically comprising a looped conveyor affording rigid restraints by which the rolls are held from either side and advanced along a predetermined feed direction through a succession of stations including a first station, toward which rolls are lifted by an elevator in such a way as to invest a sheet of the wrapping film spread below the station, a folding station from which the pack emerges with the rolls wrapped tightly by the sheet and with two edges of the sheet flattened against the bottom face of the pack and overlapping, and a heat seal station beyond the folding station in the feed direction, comprising a roller with a heated sector positioned below the trajectory followed by the pack of rolls and rotatable in a direction concurrent with the feed direction.

To advantage, slack is induced in the wrapping by means of an offsetting element projecting radially from the face of the heat seal roller, positioned preceding the heated sector in relation to the feed direction followed by the packs of rolls and to the rotation of the roller, in such a way as to impinge on the wrapping of each pack directed through the heat seal station and cause the overlapping edges of the sheet to shift one in relation to the other; the effect is to extend the developable peripheral length of the wrapping and position the heat seal along the two edges in such a way that the rolls are free to expand internally of the wrapping once beyond the heat seal station.

BRIEF DESCRIPTION of the DRAWINGS

The invention will now be described in detail, by way of example, with the aid of the accompanying drawings, in which:

FIG. 1 illustrates part of a machine for wrapping packs of rolls incorporating the device according to the present invention, viewed in perspective with certain parts omitted better to reveal others;

FIG. 2 and FIG. 3 are perspective views respectively of an elevating station and of a restraining and folding station in the machine of FIG. 1;

FIG. 4 illustrates a heat seal station in a machine as in FIG. 1, incorporating the device according to the invention and viewed in a side elevation with certain parts omitted better to reveal others.

DESCRIPTION of the PREFERRED EMBODIMENTS

Referring to the accompanying drawings, a device according to the invention for inducing slack in film material is designed for association with the heat seal stage of a machine (of which FIG. 1 shows a part) for wrapping packs of rolls; such a machine comprises a succession of stations 1 (described in due course) by which a single sheet 2 of plastic film is wrapped over and flattened against a pack of rolls 3.

The stations 1 in question comprise at least one station where the rolls 3 are arranged in packs, each consisting of two rolls which are positioned broadside in mutual contact on elevator 12, and directed upwards into a first wrapping station 1b proper, beneath which a sheet 2 of film is spread horizontally prior to each elevation. The remaining wrapping stations 1 are arranged in sequence along a feed direction (indicated by the arrow denoted A) in such a manner that each successive pack of rolls emerges wrapped tightly in a sheet 2 of film with two edges 2a and 2b of the sheet flattened against the bottom face of the pack and overlapping. The wrapping stations 1 are succeeded along the feed direction A by a heat seal station 4 comprising a roller 5 positioned below the trajectory followed by the packs, which advance supported on a pair of horizontally disposed parallel rails 40; the roller is furnished with a heated sector 6 (for example, connected to external or slip ring contacts) and rotatable in a direction concurrent with the feed direction A followed by the pack of rolls 3.

This same heat seal roller 5 is furnished with an offsetting element 7 projecting radially from its peripheral surface, located preceding the heated sector 6 in the feed direction A, and thus leading in the direction of rotation, of which the function is to impinge on the wrapping of each advancing pack of rolls 3 and induce a translatory movement of the overlapping edges 2a and 2b one in relation to the other; the effect in practice is to increase the developable peripheral length of the wrapping (by forcing the edges upwards, in the example of the drawings) and thus locate the subsequent heat seal at a point such as will allow the rolls 3 to re-expand internally of its packaging once beyond the heat seal station 4.

More in detail, the offsetting element 7 consists in a ridgelike bar 8 secured radially to the heat seal roller 5 in a position close to the heated sector 6.

The bar 8 is associated with means 9 for adjustment of the offset, which operate by causing the bar itself to be translated radially in relation to the roller 5.

In the example illustrated, such adjustment means 9 appear as a suitable number of setscrews 10 passing through the bar 8 and threadedly engaging the base of a slot 11 afforded by the roller 5, in which the bar 8 is accommodated to a matching fit.

The formation of a pack of rolls 3, that is to say, the process whereby a wrapping is prepared, folded around the assembled rolls 3 and heat sealed, will involve a first step in which the rolls 3, already disposed in the final packaging configuration, are directed upward by the elevator 12 from an assembly station (conventional, therefore not illustrated), toward the initial wrapping station 1b, as shown in FIG. 2.

In a second step, the sheet 2 of plastic film is invested by the ascending rolls 3, which are partly enveloped as a result both of the manner of the interception and of the action of a plurality of restraints 13 afforded by each side of the wrapping station 1b (FIG. 3), rigidly associated with closed loop conveyor means 30 illustrated in the drawings as a pair of chains; thereafter, the longitudinal edges 2a and 2b of the sheet 2 are flattened into overlapping contact against the bottom face of the pack of rolls 3 by horizontal folders 14, such that the pack is enveloped completely in the peripheral dimension, and in a fourth and final step, the two overlapping edges 2a and 2b of the sheet 2 are heat sealed (as illustrated in FIG. 1).

Following the third folding step and immediately prior to the heat seal operation, the overlapping edges 2a and 2b are forced toward the middle of the pack, or at all events into the gap between the two rolls 3, such that the developable length of the wrapping is extended for a duration sufficient to heat seal the two edges 2a and 2b in this same configuration (as discernible from FIG. 4); with the seal effected, the tautness of the wrapping will be restored by the natural elasticity of the film. With a device thus embodied, it becomes possible to assemble and fashion faultlessly wrapped packs of rolls exhibiting no loss of shape internally, and moreover, without prolonging the duration of the operating steps and without any alteration to the architecture of existing machines.

What is claimed is:

1. In a roll wrapping machine for wrapping packs of rolls comprising an overhead conveyor, said overhead conveyor having a pair of spaced vertical restraints extending downwardly from said conveyor, said restraints being spaced apart to hold one compressed pack of rolls between said pair of restraints, a first wrapping station having an elevator means to feed said one pack of rolls between said vertical restraints wherein said vertical restraints will compress and hold said one pack of rolls, a wrapping film between said vertical restraints and said one pack of rolls, said wrapping film being positioned such that when said pack of rolls is positioned between said vertical restraints at said wrapping station said wrapping film is positioned substantially around said compressed pack of rolls; a folding station having means to fold said wrapping sheet around said pack of rolls to provide two overlapping edges of said wrapping sheet flattened against a face of said pack of rolls, and a heat seal station located downstream from the folding station with respect to a feed direction of said conveyor seal, said heat station having a heat seal roller, said heat seal roller having a heat sealing sector, and an offsetting element projecting radially from the heat seal roller, said offsetting element positioned on the heat seal roller upstream from said heat sealing sector in relation to the feed direction of said conveyor and the rotating direction of said roller, said heat seal roller positioned to have said heat sealing sector contact said wrapping sheet overlapping edges to heat seal said overlapping edges wherein when said heat seal roller rotates, said offsetting element first contacts said overlapping edges to induce a sliding of the overlapping edges of the sheet relative to each other to extend a length of the wrapping before the joining of the two overlapping edges by the heat seal roller to allow for a subsequent expansion of the rolls inside the sealed wrapper when the pack of rolls leave the heat seal station.

2. A device as in claim 1, wherein the offsetting element consists in a bar fastened radially to the heat seal roller in a position close to the heat sealing sector and radially positionable toward and away from the roller by an adjustment means.

3. A device as in claim 2, wherein the adjustment means is at least one setscrew threaded centrally through the bar threadedly engaging a base of a slot in the roller in which the bar is accommodated in a matching fit.

4. A method of folding and heat sealing plastic film material to form a wrapping around a pack of rolls, comprising:

a first step of directing the rolls upward from an assembly station to an overhead conveyor holder including a pair of spaced, downwardly extending vertical restraints to partially wrap said pack of rolls in a wrapping sheet and compress and hold said pack of rolls between said vertical restraints;

folding said wrapping sheet around the partially wrapped pack of rolls to provide two overlapping edges of the sheet flattened against a face of said pack of rolls while said pack of rolls is maintained between said vertical restraints;

contacting the overlapped edges of the sheet with an offsetting element projecting radially from a heat seal roller for sliding the overlapping edges of said sheet relative to each other to extend the length of the wrapping around the pack of rolls;

heat sealing the overlapping edges with a heat sealing sector of the heat seal roller located on the roller downstream of the offsetting element in the rotating direction of said roller, and then releasing the pack of rolls from between said vertical restraints.

* * * * *